Feb. 3, 1959

C. W. ROBERTS 2,871,593

ELECTRONIC TALKING MANIKIN

Filed March 1, 1957

INVENTOR.
CHARLES W. ROBERTS
BY
ATTORNEY

Feb. 3, 1959  C. W. ROBERTS  2,871,593
ELECTRONIC TALKING MANIKIN
Filed March 1, 1957  3 Sheets-Sheet 2

INVENTOR.
CHARLES W. ROBERTS
BY
ATTORNEY

Feb. 3, 1959  C. W. ROBERTS  2,871,593
ELECTRONIC TALKING MANIKIN
Filed March 1, 1957  3 Sheets-Sheet 3

INVENTOR.
CHARLES W. ROBERTS
BY
ATTORNEY

United States Patent Office 2,871,593
Patented Feb. 3, 1959

2,871,593
ELECTRONIC TALKING MANIKIN
Charles W. Roberts, New York, N. Y.
Application March 1, 1957, Serial No. 643,394
11 Claims. (Cl. 40—28.3)

This invention relates to the art of animated electronic vocal manikins.

The invention concerns a manikin provided with a movable head, eyes, jaw and arms. The several body members are movable synchronously with the emission of speech and song renditions provided by associated audio reproducing apparatus. The mechanism and circuitry are arranged so that intervals of apparent talking and singing by the manikin are alternated with intervals of music. During the musical intervals the manikin may continue body movements while jaw movements cease, as if the manikin were dancing or moving in time to the music.

It is a principal object of the invention to provide a manikin with a movable head, eyes, jaw and arms.

It is a further object to provide a manikin with a head, eyes, jaw, and arms movable by motors actuated in response to vocal and musical signals emitted by accompanying audio apparatus.

It is a further object to provide a manikin having a head and eyes movable from side to side with the head being capable of nodding as it moves.

It is a further object to provide an audio system with relays for controlling power applied to motors in a manikin having movable body parts, the relays being so arranged that the head, eyes and arms of the manikin move during the rendition of vocal and musical programs provided by the system, and in addition the mouth of the manikin opens and closes synchronously with the rendition of the vocal sounds by the system.

It is a further object to provide a system of the character described wherein the musical program is automatically cut off when the vocal program starts and the musical program resumes when the vocal program stops.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 8:
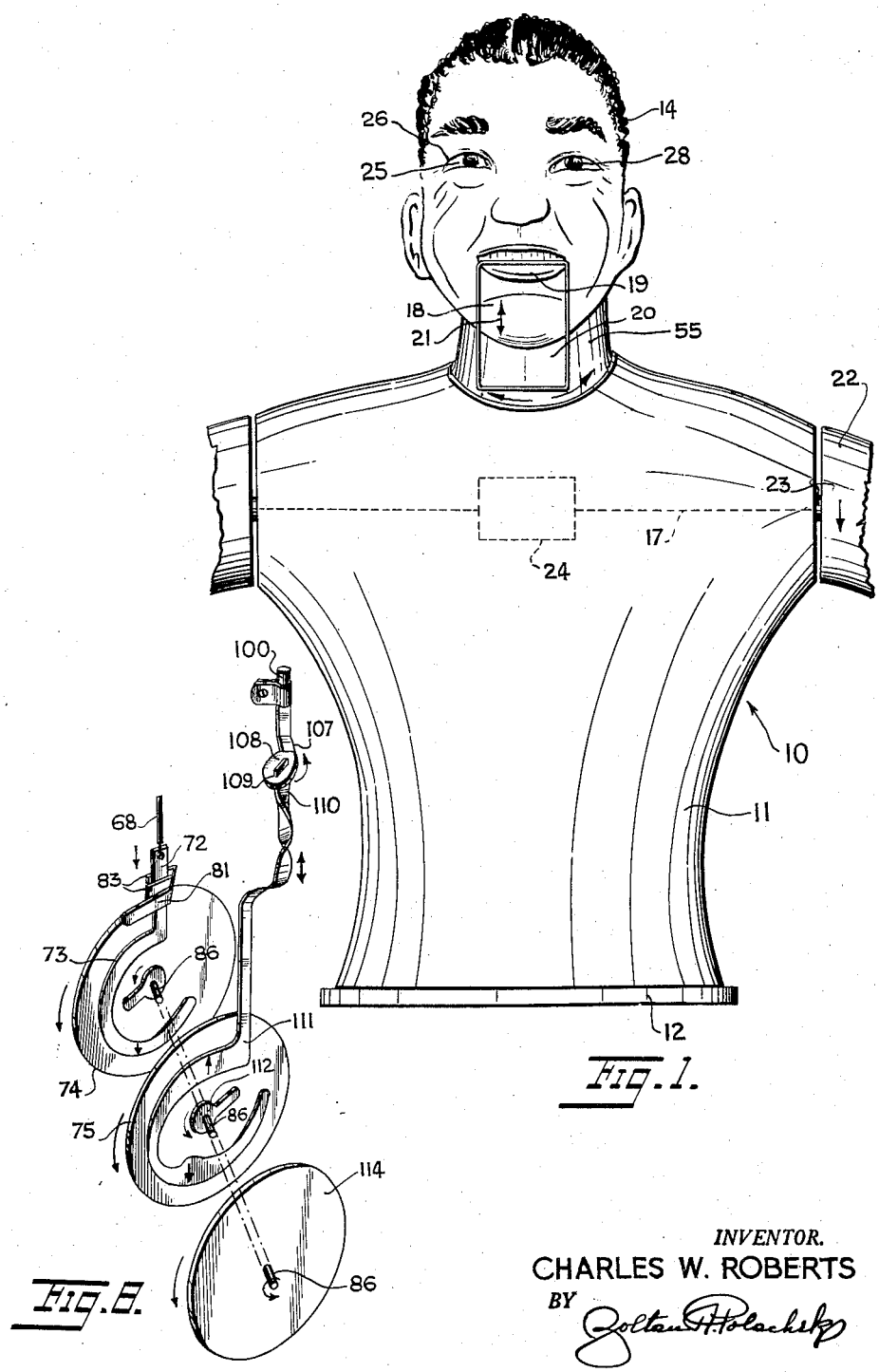
Fig. 1 is a front elevational view of a manikin figure according to the invention.
Fig. 8 is an exploded perspective view of a cam assembly employed as part of the eye and head operating mechanism.

In Fig. 1 is shown a manikin figure 10. The figure is shown as a bust 11 resting on a flat base 12. If desired, the figure could be a complete body provided with movable legs. The bust 11 shown in Fig. 1 is arranged for stationary mounting on base 12. Head 14 is a separate member which is movable rotationally from side to side as indicated by arrows 15. The head is also pivotable forwardly and backwardly. The lower jaw 18 of the figure which includes portions extending from the lower lip 19 to the neck portion 20 is mounted in the head and is pivotable as indicated by arrow 21. A pair of arms 22 are pivotally secured to the bust 11 on shafts 23. A motor 24 is mounted within the bust and is mechanically connected by links 17 to shafts 23 for actuating the arms. The figure has a pair of eyes 25 mounted behind the eye openings 26 in the head. These eyes are movable from side to side by a mechanism to be explained.

Figures 2, 3:
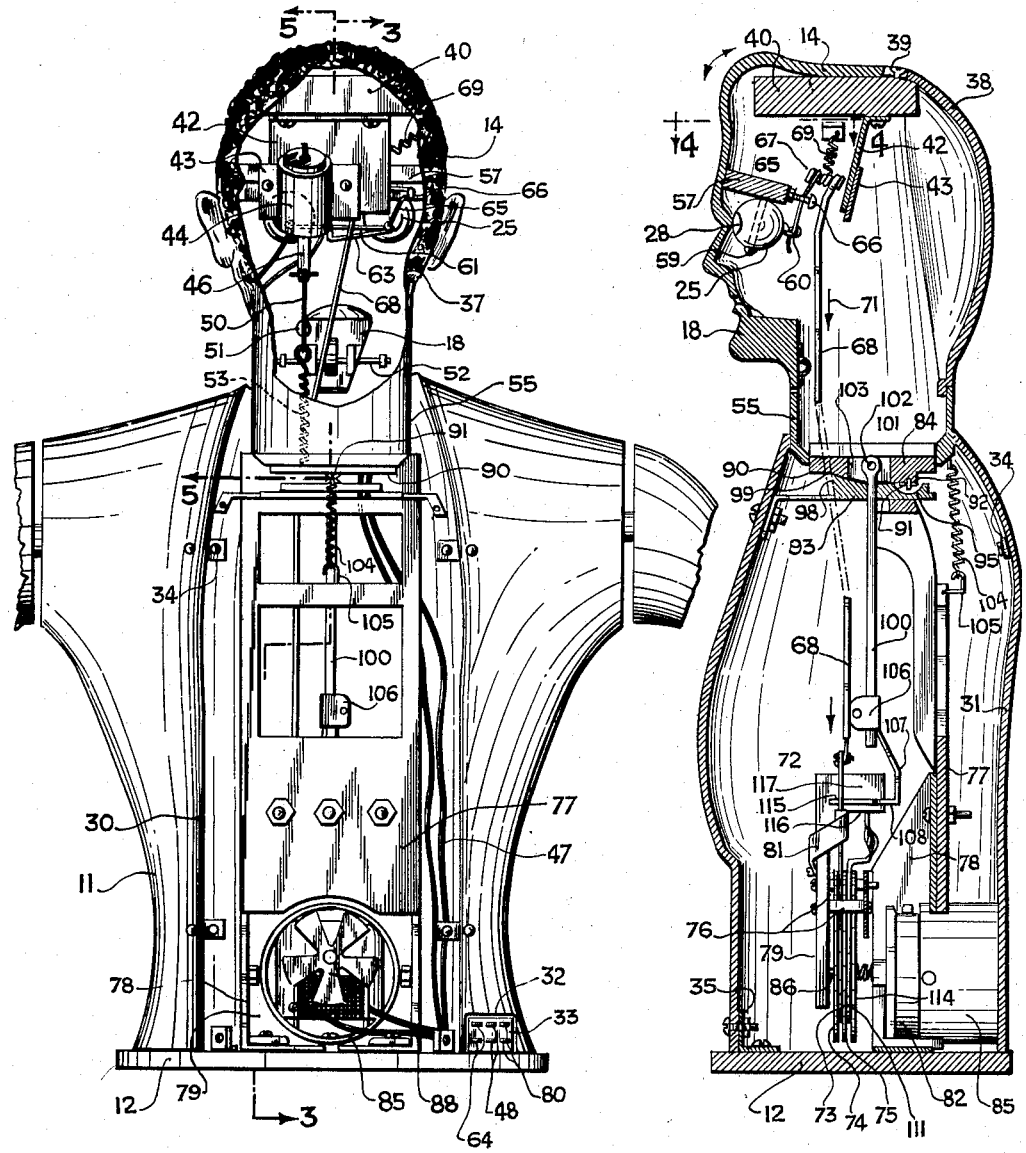
Fig. 2 is a rear elevational view of the manikin figure with portions removed to show internal parts.
Fig. 3 is a sectional view taken on lines 3—3 of Fig. 2.

The bust 11 is a hollow plastic or fiber member as shown in Figs. 2 and 3. A longitudinal rear opening 30 is provided through which access is had to the internal parts. Brackets 34 at the sides of opening 30 and on base 12 serve for attachment of the rear cover 31 which is shown in place in Fig. 3. At the lower end of the bust is an aperture 32 at which is exposed the six terminal socket 33 by means of which electrical connection is made with the various motors in the figure. The bust 11 is secured to base 12 by further brackets 35 in which are engaged suitable bolts 36. In the rear of head 14 is an opening 37 through which is had access to the interior parts at the upper part of the figure. A removable cover 38 is provided to close this opening. Cover 38 is secured to the head by screws 39 lodged in a wood block 40.

Figure 5:
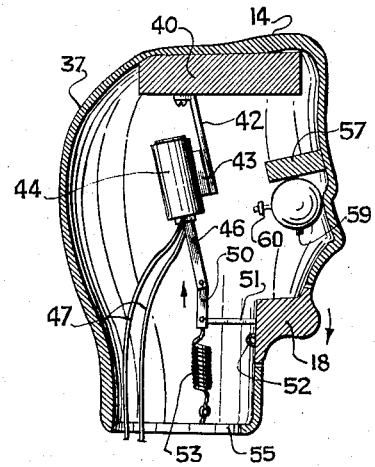
Fig. 5 is a longitudinal sectional view taken on lines 5—5 of Fig. 2 showing details of the mouth-operating mechanism.

A metal plate 42 is secured to block 40. To plate 42 is secured a bracket 43 which supports the cylindrical body 44 of a solenoid having a plunger 46 axially mounted therein. Wires 47 are connected to the solenoid and terminate at two contacts 48 of the socket 33. A link 50 is attached to plunger 46. Link 50 is rigidly attached to another link or lever 51 best shown in Fig. 5. This link 51 is anchored in jaw 18. The jaw is pivotally mounted on pintle 52 journalled in the throat 55 of the figure. A spring 53 is secured to the lower end of link 50 and serves to pull down the plunger 46 and pivot the jaw 16 to a closed position when the solenoid 44 is de-energized. The spring 53 is anchored at the base of the throat 55.

Figure 4:
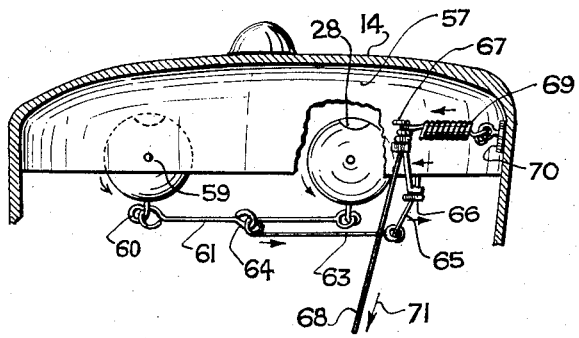
Fig. 4 is a plan sectional view of a portion of the figure taken on lines 4—4 of Fig. 3 and showing details of the eye-operating mechanism.

A wood block 57 is secured to the forehead of the figure. Eyes 25 are two spheres which are pivotally mounted in spaced positions on block 57 by shafts 59. Attached to each eye is a loop 60, as best shown in Fig. 4. A link 61 having looped ends is engaged with loops 60. A link 63 is engaged on the center loop 64 of line 61. Another link 65 extends from the end of link 63 around pin 66 to a floating pin 67. Pin 66 is anchored in block 57. A wire or rod 68 terminates at pin 67. A spring 69 is connected between pin 67 and a base block 70 attached to head 14.

Figure 7:
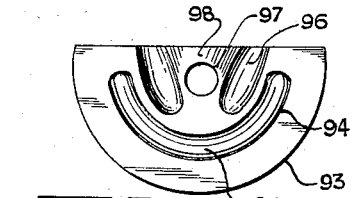
Fig. 7 is a bottom plan view of another cam plate.

Wire or rod 68 is movable downwards as indicated by arrow 71 against the tension in spring 69. Wire 68 terminates at its lower end on the shaft end 72 of a curved cam plate 73 as best shown in Fig. 7. This cam plate is movable vertically between spaced circular guide plates 74 and 75. These guide plates are secured to rotatable shaft 86 which is journalled in frame plate 79. Plate 79 is supported on posts 76 attached to side frame members 78. This frame which is located inside the manikin has front plate 79, side frame members 78 and a rear vertical plate 77. An arm 81 formed with two parallel fingers 83 in which flat shaft 72 is slidable is secured to plate 79. A motor 85 is mounted at the base of the bust 11. This motor has a forwardly disposed speed reduction gear box 82 from which extends shaft 86. On shaft 86 is mounted a cam 87 arranged to depress the cam plate 73 and cause wire 68 to be lowered during a portion of the rotation of the shaft 86. Upward or return movement of the wire 68 and cam plate 73 is accomplished by spring 69. Links 61, 63 and spring 69 are so arranged that when wire 68 is pulled down the eyes 25 turn to the left as viewed in Fig. 4. When the spring 69 pulls the wire 68 upward the two eyes move to the right. In a central position the spring is partially tensioned and the pupils 28 of the eyes face forwardly at the eye openings 26. Wires 88 are connected to terminals 64 of socket 33 as shown in Fig. 2.

Figure 6:
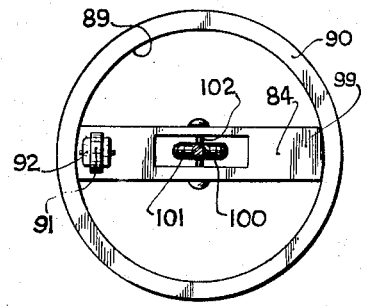
Fig. 6 is a top plan view of a cam plate employed in the manikin figure.

At the base of throat 55 is a circular ring 90 which has a crossbar 84 centrally disposed and carrying a depending post 92. The post supports a rotatable wheel 91 as shown in Figs. 3 and 7. This wheel is arranged to ride on a horizontal cam plate 93 secured at the upper end of bust 11. Wire 68 and wires 47 pass through openings 89 in the ring 90. Plate 93, as best shown in Fig. 6, has an arcuate groove 94 which is shallow at both its ends and has a deeper central portion 95. A pair of shallow grooves 96 are disposed at the sides of aperture 97. The portion 98 of plate 93 between grooves 96 and adjacent the edge of the plate is raised above the remainder of the plate to form a ridge. Crossbar 84 has a forward depending projection or knob 99 arranged to ride over ridge 98 from one of grooves 96 to the other groove 96 while wheel 91 rides in groove 94.

In order to rotate the horizontal ring 90, there is provided a shaft 100 having a head 101 pivotally supported on a pintle 102. The pintle extends transversely across slot 103 in the crossbar 84. When shaft 100 rotates, ring 90 and the entire head of the manikin also rotates. During rotation of the head 14, the wheel 91 moves in groove 94 from one shallow portion to the other past the depression 95. While the head is turned to one side, wheel 91 is near one end of groove 94 while the knob 99 is in a portion of one of grooves 96. This causes the head to nod or tilt forward slightly against the tension of a spring 104 secured between ring 90 and a hook 105 on frame plate 77. As the head passes through a directly forward facing position knob 99 is positioned on ridge 98 while wheel 91 is in depression 95, so that the head 14 is held upright. Shaft 100 rotates through an angle somewhat less than 180°. The total angular extent of movement of the head is substantially that of the arcuate groove 94.

Shaft 100 is secured by clamp 106 to a bent arm 107 best shown in Fig. 8. This arm has a flat horizontal portion 108 in which is a slot 109. Through this slot extends the upper end 110 of a flat cam follower plate 111. This shaft end 110 is twisted in such a manner that when the plate 111 is lifted, shaft 100 is caused to rotate in one direction and when the plate 111 is lowered arm 107 and shaft 100 rotates in the opposite direction. A cam 112 mounted on shaft 86 serves to cause the plate 111 to be raised and lowered once during each rotation of shaft 86. Plate 111 moves between guide plate 75 and another guide plate 114 mounted on shaft 86. The flat portion 108 of arm 107 is guided in a slot 115 formed by two horizontal flat leaves 116 and 117 at the top of plate 79. Both leaves 116 and 117 have aligned apertures so that the shaft end 110 can pass through them as the plate 111 is raised and lowered.

Figure 9:
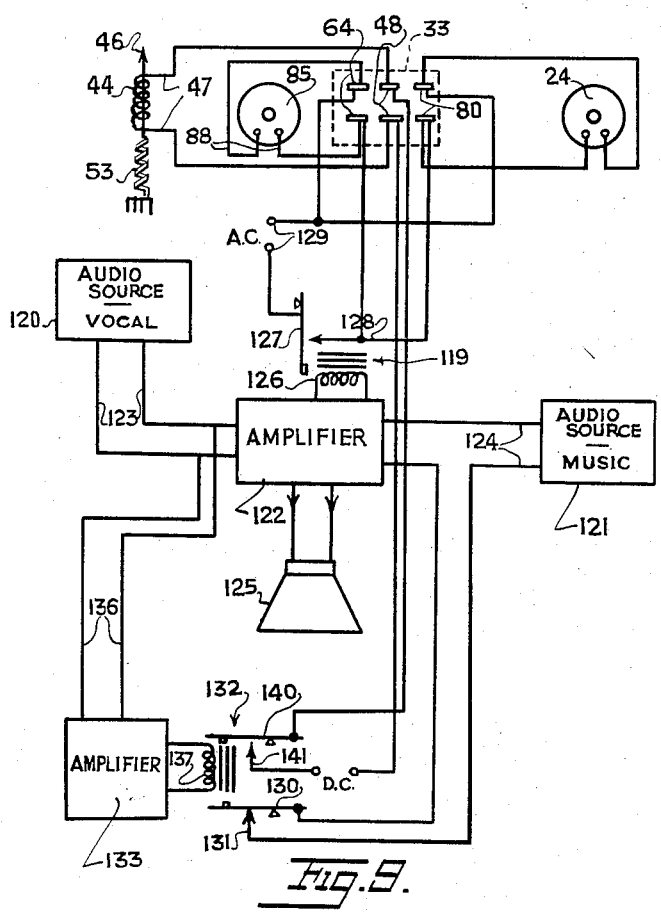
Fig. 9 is a diagram of an electrical arrangement for actuating the motors driving the several mechanisms in the manikin figure.

In Fig. 9 is shown a diagram of an electrical system which may be used in conjunction with the manikin as described above. Two audio signal sources are provided. One source 120 provides a vocal program such as speech, songs, recitations, etc. The other audio source 121 provides music such as instrumental, orchestral, etc. Each audio source may be a separate disk or tape audio reproducer or it may be a program originating at a remote point and conveyed by radio or wire to the apparatus. The audio signals are transmitted to inputs of amplifier 122 from both audio sources by wires 123 and 124, respectively. The vocal signals amplified in amplifier 122 are delivered from one output to one or more loudspeakers 125. If desired, a loudspeaker 125 may be located within the body of the manikin. The amplifier 122 has an additional output connected to relay coil 126 of relay 119. This coil actuates movable contact 127 so that it closes an alternating current power circuit with fixed contact 128. The A. C. power is provided at terminals 129. These terminals are connected in parallel to contacts 80 and 64 of socket 33. Motors 24 and 85 are thus energized since they are connected to these contacts of socket 33. Motor 24 causes the arms 22 of the manikin to move and motor 85 causes the head and eyes of the manikin to move. The eyes, head and arms will move as long as amplifier 122 has any output so that the A. C. circuit is kept closed. If the amplifier has no output then no audio signals are being delivered to it and the motion of the head, eyes and arms of the manikin ceases.

Audio source 121 is connected through movable contact 130 and fixed contact 131 of a relay 132 to amplifier 122. Contacts 130, 131 are normally closed but are opened when the relay 132 is energized. This relay is energized whenever there is any audio signal provided at vocal audio source 120. This signal from source 120 is delivered to amplifier 133 via wires 136. The coil 137 at the output of amplifier 133 receives the amplified signal so that the relay 132 is energized. It will thus be apparent that the arms, eyes, and head of the manikin will be operated whenever audio signals are provided from either of audio sources 120 and 121. During vocal intervals, music source 121 is disconnected from amplifier 122 but the music is restored automatically to amplifier 122 as soon as the vocal signals of speech or singing cease. During the music intervals the manikin moves its head, arms and eyes in a manner which appears as if the manikin is keeping time to the music. The jaw 18 does not open during the music intervals. During both music and vocal intervals the manikin will move its head from side to side and nod its head while so doing. At the same time the eyes move in a life-like manner as do the arms.

Movements of the jaw 18 are performed only during vocal intervals. This is accomplished by means of contacts 140 and 141 at relay 132 which close when the relay is energized. Then direct current pulses are delivered from D. C. terminals 144 to contacts 48 of socket 33. Each time coil 44 is energized plunger 46 is pulled up to open jaw 18. Spring 53 restores the plunger 46 to its lowered position and restores the jaw to its closed position. The relay 132 and amplifier 133 may be arranged so that motor 44 responds once for each word or each syllable of vocal signal in a manner similar to that disclosed in patent to Deitz 2,247,329. Thus the manikin will appear to be actually talking and singing while the loudspeaker 125 is emitting the vocal sounds. During music intervals, the relay 132 is deenergized so that contacts 140 and 141 are open. Then the jaw of the manikin remains closed until the next vocal interval begins. If desired a timing device may be provided at the vocal audio source 120 to turn this source on and off at periodic intervals so that a program with voice and music in alternation may be continuously provided.

The invention has particular utility as an advertising display device as well as an entertainment means. The vocal program could consist of an advertising message which is delivered for a predetermined time; or the manikin could sing a song during a vocal interval. At the conclusion of the song the manikin would be silent but the music program would start while the manikin moved in time to the music. Then the vocal program would resume which would automatically cut off the music for another predetermined period of time. The system thus is capable of operating entirely automatically since it is wholly under the control of the audio signals provided from the respective audio program sources.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A manikin and associated audio system, comprising an amplifier having input and output terminals a pair of audio signal sources providing vocal and musical programs respectively, one of said sources being connected to one pair of terminals of the amplifier, a relay disposed at the output terminals of the amplifier and arranged to close a first power circuit in response to actuation of the relay, a pair of motors arranged to be driven by power supplied by said first power circuit, one of said motors being operatively connected to a head and two eyes of the manikin to move said head and eyes from side to side, the other of said motors being connected to a pair of arms of the manikin for rotational movements thereon, the other of said sources being in circuit with a first pair of contacts of another relay and being directly connected to another pair of input terminals of said amplifier, the first pair of contacts of said other relay being normally closed and being opened when said one audio source is delivering an audio program to said amplifier, a third motor, said third motor being operatively connected to the jaw of the manikin, said jaw being pivotable thereby, said third motor being in circuit with another pair of contacts of said other relay, said other pair of contacts being normally open and arranged to be closed when said one source is delivering said audio program to said amplifier, and a direct current power source in circuit with said third motor and said other pair of contacts for energizing said third motor, whereby said other audio source is automatically interrupted when said audio program is being delivered to said amplifier and said third motor is deenergized when said other audio source is delivering another audio program to said amplifier.

2. A manikin and associated audio system, comprising an amplifier having input and output terminals a pair of audio signal sources providing vocal and musical programs respectively, one of said sources being connected directly to one pair of input terminals of the amplifier, a relay disposed at the output terminals of the amplifier and arranged to close a first power circuit in response to actuation of the relay, a motor arranged to be driven by power supplied by said first power circuit, said motor being operatively connected to a head and two eyes of the manikin to move said head and eyes from side to side, the other of said sources being in circuit with a first pair of contacts of another relay and being directly connected to another pair of input terminals of said amplifier, said first pair of contacts of said other relay being normally closed and being opened when said one source is delivering an audio program to said amplifier, a second motor, said second motor being operatively connected to the jaw of the manikin, said jaw being pivotable thereby, said second motor being in circuit with another pair of contacts of said other relay, said other pair of contacts being normally open and arranged to be closed when said one source is delivering said audio program to said amplifier, and another power source in circuit with said second motor and said other pair of contacts for energizing said second motor, whereby said other audio source is automatically interrupted when said audio program is being delivered to said amplifier and said second motor is deenergized when said other audio source is delivering another audio program to said amplifier.

3. A manikin and associated audio system, comprising an amplifier, an audio signal source providing vocal programs, said source being connected to an input of said amplifier, a relay disposed at the output of the amplifier and arranged to close a first power circuit in response to actuation of the relay, a pair of motors arranged to be driven by power supplied by said first power circuit, one of said motors being operatively connected to a head and two eyes of the manikin to move said head and eyes from side to side, the other of said motors being connected to a pair of arms of the manikin for rational movements thereon, a third motor, said third motor being operatively connected to the jaw of the manikin, said jaw being pivotable thereby, said third motor being in circuit with a pair of contacts of another relay, said pair of contacts being normally open and arranged to be closed when said audio source is delivering an audio program to said amplifier, and a direct current power source in circuit with said third motor and said pair of contacts for energizing said third motor, whereby said third motor is deenergized when said audio program is interrupted.

4. A manikin and associated audio system, comprising an amplifier; an audio signal source providing vocal programs, said source being connected to said amplifier, a relay disposed at the output of the amplifier and arranged to close a first power circuit in response to actuation of the relay, a motor arranged to be driven by power supplied by said first power circuit, said motor being operatively connected to a head and two eyes of the manikin to move said head and eyes from side to side, a second motor, said second motor being operatively connected to the jaw of the manikin, said jaw being pivotable thereby, said second motor being in circuit with a pair of contacts of another relay, said contacts being normally open and arranged to be closed when said audio source is delivering an audio program to said amplifier, and a direct current power source in circuit with said second motor and said pair of contacts for energizing said second motor, whereby said third motor is deenergized when said audio program is interrupted.

5. A manikin having a movable head, eyes and jaw, said head being supported on a hollow bust, a first cam plate mounted on the top of the bust, a cam ring carried by the head and arranged to move slidably over the first plate, a shaft pivotally attached to said cam ring and rotatable from side to side through an angle of about one hundred and eighty degrees, said head being arranged to nod by coaction of the cam ring and cam plate as the head reaches its extremes of angular rotation, a motor, said shaft being driven by cam means operatively connected to said motor, said cam means including a movable cam member having a twisted flat end engaged in a slotted arm, said arm being secured to said shaft, said eyes being joined by a first link, a pair of further links pivotally attached in succession to said first link, a wire secured to one end of said pair of links, said wire being secured to another cam member, said other cam member being arranged to be depressed by another cam means operated by said motor, said jaw being pivotally carried by said head, and a solenoid actuated plunger operatively connected to said jaw and arranged to pivot the jaw against tension of a spring connected between said plunger and said head.

6. A manikin having a movable head and eyes, said head being supported on a hollow bust, a first cam plate mounted on the top of the bust, a cam ring carried by the head and arranged to move slidably over the first plate, a shaft pivotally attached to said cam ring and rotatable from side to side through an angle of about one hundred and eighty degrees, said head being arranged to nod by coaction of the cam ring and cam plate as the head reaches its extremes of angular rotation, a first motor, said shaft being driven by cam means operatively connected to said motor, said cam means including a movable cam member having a twisted flat end engaged in a slotted arm, said arm being secured to said shaft, said eyes being pivotally mounted in said head at openings therein, said eyes being joined by a first link, a pair of further links pivotally attached in succession to said first link, and a wire secured to one end of one of said pair of links, said wire being secured to another cam member, said other cam member being arranged to be depressed by another cam means operated by said motor.

7. A manikin having a movable head and jaw, said head being supported on a hollow bust, a first cam plate mounted on the top of the bust, a cam ring carried by the head and arranged to move slidably over the first plate, a shaft pivotally attached to said cam ring and rotatable from side to side through an angle of about one hundred and eighty degrees, said head being arranged to nod by coaction of the cam ring and cam plate as the head reaches its extremes of angular rotation, a first motor, said shaft being driven by cam means operatively connected to said motor, said cam means including a movable cam member having a twisted flat end engaged in a slotted arm, said arm being secured to said shaft, said jaw being pivotally carried by said head, and a solenoid actuated plunger operatively connected to said jaw and arranged to pivot the jaw against tension of a spring connected between said plunger and said head.

8. A manikin having a movable head, said head being supported on a hollow bust, a first cam plate mounted on the top of the bust, a cam ring carried by the head and arranged to move slidably over the first plate, a shaft pivotally attached to said cam ring and rotatable from side to side through an angle of about one hundred and eighty degrees, said head being arranged to nod by coaction of the cam ring and cam plate as the head reaches its extremes of angular rotation, and a motor, said shaft being driven by cam means operatively connected to said motor, said cam means including a movable cam member having a twisted flat end engaged in a slotted arm, said arm being secured to said shaft.

9. A manikin and associated audio system, comprising a pair of audio signal sources providing vocal and musical programs respectively, one of said sources being connected in parallel to two amplifiers, a relay disposed at one output of one of the amplifiers and arranged to close a first power circuit in response to actuation of the relay, a pair of motors arranged to be driven by power supplied by said first power circuit, one of said motors being operatively connected to a head and two eyes of the manikin to move said head and eyes from side to side, the other of said motors being connected to a pair of arms of the manikin for rotational movements thereon, the other of said sources being in circuit with a pair of contacts of another relay and connected to an input of said one amplifier, said other relay being disposed at the output of the other amplifier, said relay contacts being normally closed and being opened when said one audio source is delivering an audio program to said amplifiers, a third motor, said third motor being operatively connected to the jaw of the manikin, said jaw being pivotable thereby, said third motor being in circuit with another pair of contacts of said other relay, said other pair of contacts being normally open and arranged to be closed when said one source is delivering said audio program to said amplifiers, and another power source in circuit with said third motor and said other pair of contacts for energizing said third motor, whereby said other audio source is automatically interrupted when said audio program is being delivered to said amplifiers, and said third motor is deenergized when said other audio source is delivering another audio program to said one amplifier.

10. A manikin and associated audio system, comprising a pair of audio signal sources providing vocal and musical programs respectively, one of said sources being connected directly to inputs of two amplifiers, a first relay disposed at the output of one of the amplifiers and arranged to close a first power circuit in response to actuation of the relay, a motor arranged to be driven by power supplied by said first power circuit, said motor being operatively connected to a head and two eyes of the manikin to move said head and eyes from side to side, the other of said sources being in circuit with a pair of contacts of another relay and connected to another input of said one amplifier, said relay contacts being normally closed and being opened when said one source is delivering an audio program to said amplifiers, a second motor, said second motor being operatively connected to the jaw of the manikin, said jaw being pivotable thereby, said second motor being in circuit with another pair of contacts of said other relay, said other pair of contacts being normally open and arranged to be closed when said one source is delivering said audio program to said amplifiers, and another power source in circuit with said second motor and said other pair of contacts for energizing said second motor, whereby said other audio source is automatically interrupted when said audio program is being delivered to said amplifiers, and said second motor is deenergized when said other audio source is delivering another audio program to said one amplifier.

11. In combination a manikin having a movable head, eyes, and jaw, said head being supported on a hollow bust, a first cam plate mounted on the top of the bust, a cam ring carried by the head and arranged to move slidably over the first plate, a shaft pivotally attached to said cam ring and rotatable from side to side through an angle of about one hundred and eighty degrees, said head being arranged to nod by coaction of the cam ring and cam plate as the head reaches its extremes of angular rotation, a motor, said shaft being driven by cam means operatively connected to said motor, said cam means including a movable cam member having a twisted flat end engaged in a slotted arm, said arm being secured to said shaft, said eyes being joined by a first link, a pair of further links pivotally attached in succession to said first link, a wire secured to one end of one of said pair of links, said wire being secured to another cam member, said other cam member being arranged to be depressed by another cam means operated by said motor, said jaw being pivotally carried by said head, and a solenoid actuated plunger operatively connected to said jaw and arranged to pivot the jaw against tension of a spring connected between said plunger and said head; and an audio system, said system comprising an audio signal source providing vocal programs, said source being connected to an input of an amplifier, a relay disposed at the output of the amplifier and arranged to close a first power circuit in response to actuation of the relay, said motor being arranged to be driven by power supplied by said first power circuit, said motor being operatively connected to said head and eyes of the manikin to move the head and eyes from side to side, said solenoid being in circuit with a pair of relay contacts, said pair of contacts being normally open and arranged to be closed when said audio source is delivering an audio program to said amplifier, and a direct current power source in circuit with said solenoid motor and said pair of contacts for energizing said solenoid, whereby said solenoid is deenergized when said audio program is interrupted.

References Cited in the file of this patent

UNITED STATES PATENTS

| 2,206,095 | Jolly | July 2, 1940 |
| 2,247,329 | Deitz | June 24, 1941 |
| 2,270,142 | Robinson et al. | Jan. 13, 1942 |
| 2,324,774 | Henry | July 30, 1943 |